(12) United States Patent
Parry

(10) Patent No.: US 6,391,627 B1
(45) Date of Patent: May 21, 2002

(54) SBS MASS TREATMENT SYSTEM

(75) Inventor: Julian D. Parry, Nailsea (GB)

(73) Assignee: SBS Technology (GB) Ltd., Wiltshire (GB)

( * ) Notice: Subject to any disclaimer, the term of this patent is extended or adjusted under 35 U.S.C. 154(b) by 0 days.

(21) Appl. No.: 09/269,534

(22) PCT Filed: Jul. 6, 1998

(86) PCT No.: PCT/GB98/02000

§ 371 Date: Mar. 30, 1999

§ 102(e) Date: Mar. 30, 1999

(87) PCT Pub. No.: WO99/01237

PCT Pub. Date: Jan. 14, 1999

(30) Foreign Application Priority Data

Jul. 4, 1997 (GB) .......................................... 97141121

(51) Int. Cl.⁷ ................................................. C12M 1/00
(52) U.S. Cl. ............................... 435/290.1; 435/286.5; 435/286.6; 435/290.4
(58) Field of Search .................... 435/286.5, 286.6, 435/289.1, 290.1, 290.4; 71/9

(56) References Cited

U.S. PATENT DOCUMENTS

| | | | |
|---|---|---|---|
| 4,410,349 A | 10/1983 | Laurenson | ........................ 71/9 |
| 4,837,153 A | 6/1989 | Laurenson | .................. 435/243 |

FOREIGN PATENT DOCUMENTS

| | | | | |
|---|---|---|---|---|
| EP | 0 429 137 A1 | 5/1991 | | |
| EP | 0 780 166 A | 6/1997 | ............. | B09C/1/00 |
| GB | 2 213 695 A | 8/1989 | | |
| GB | 2 280 835 A | 2/1995 | ............. | B09B/3/00 |

*Primary Examiner*—David A. Redding
(74) *Attorney, Agent, or Firm*—Nixon & Vanderhye

(57) ABSTRACT

A permeable mass of remediable materials is subjected to biotic or abiotic treatment in a refillable containment in order to change the physical and/or chemical composition of the mass and/or contaminants within it by manipulating the biotic and abiotic in the subsurface environment. It is an adaptation of the SBS Close Lance system for decontamination of polluted soil. Such system when fitted to a refillable containment is used to compost and decontaminate remediable materials by promoting and exploiting biotic and abiotic activity. Ex-situ treatment of remediable materials including soils, refuse, wastes, drilling muds and minerals are possible as is composting of waste prior to alternate use by recycling.

17 Claims, 5 Drawing Sheets

Plan of large scale composting and treatment system

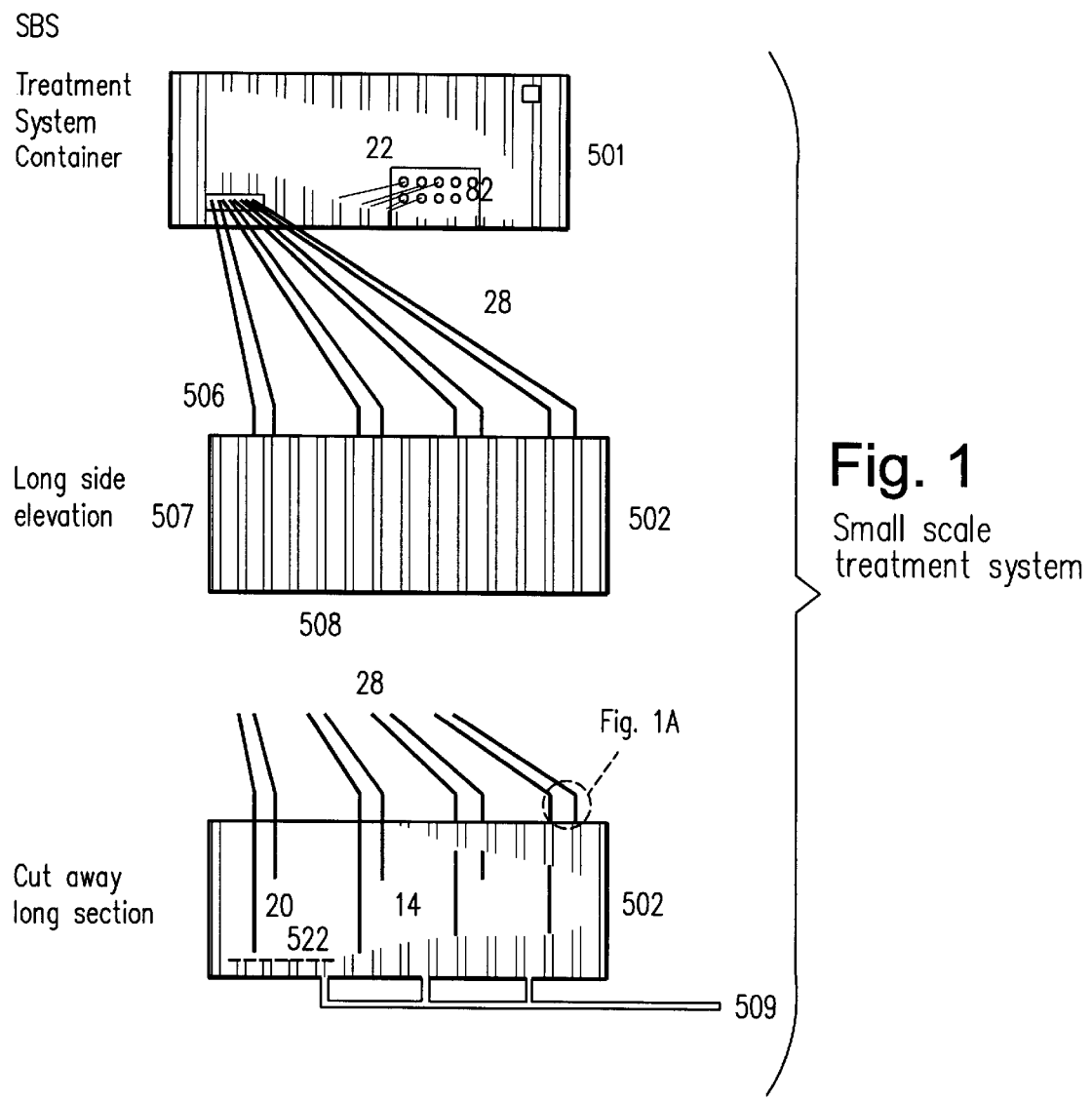
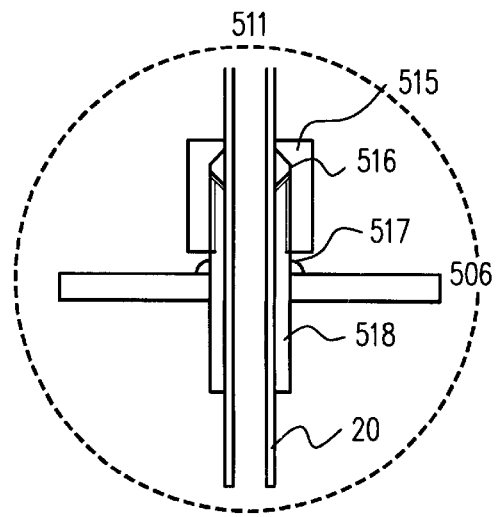
Fig. 1
Small scale treatment system
Fig. 1A

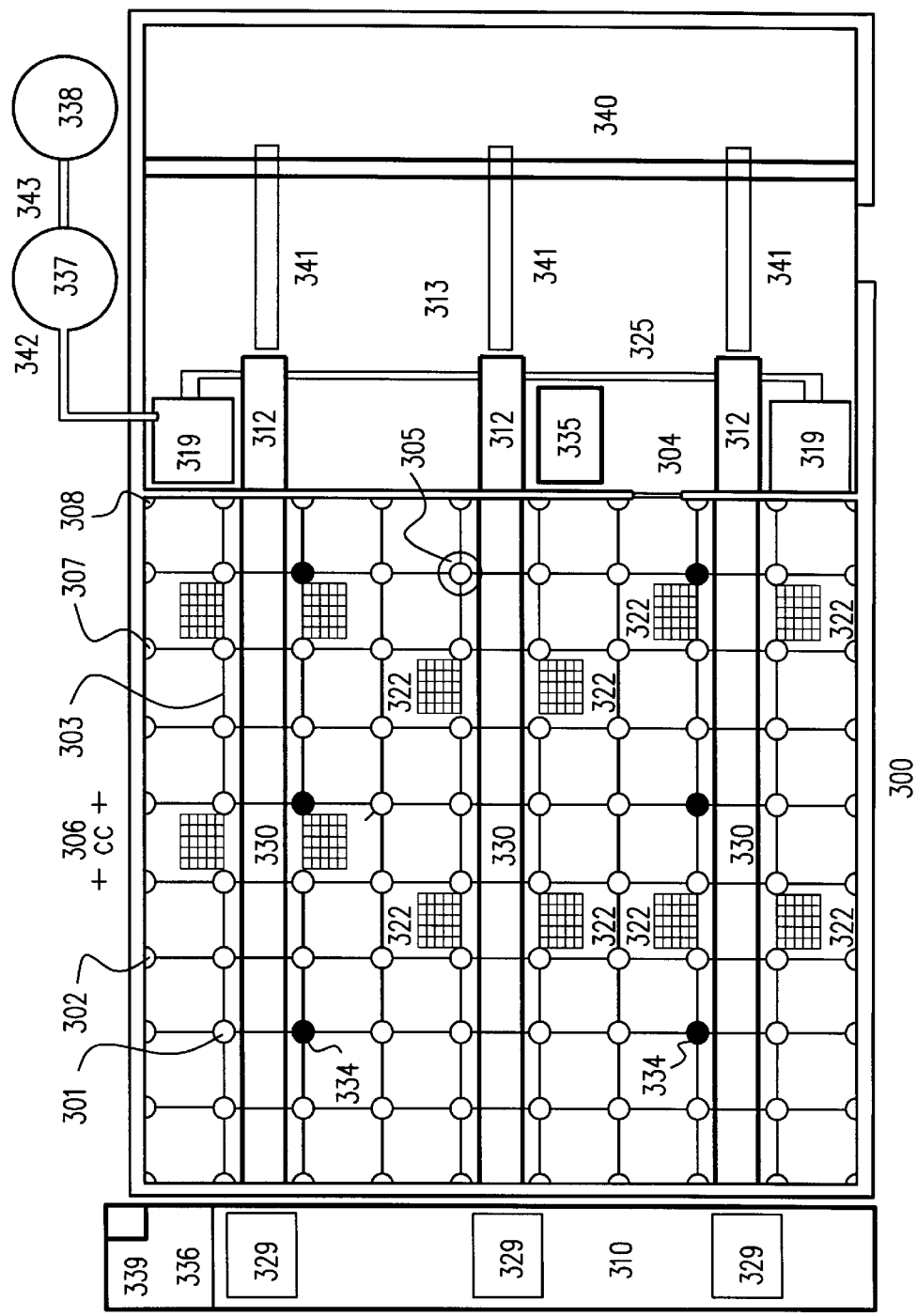
Fig. 2  Plan of large scale composting and treatment system

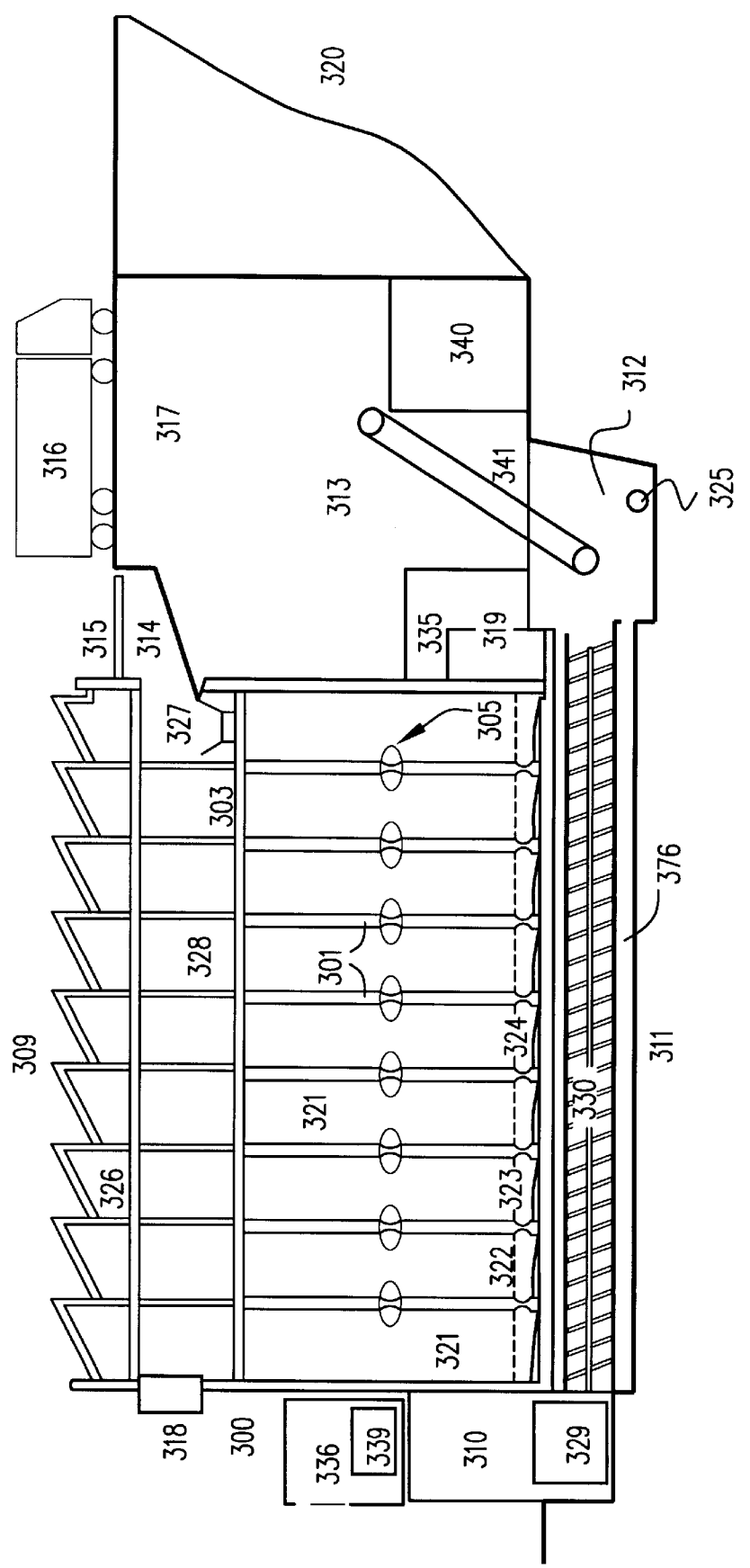
Fig. 3 Vertical section thro' large scale treatment system

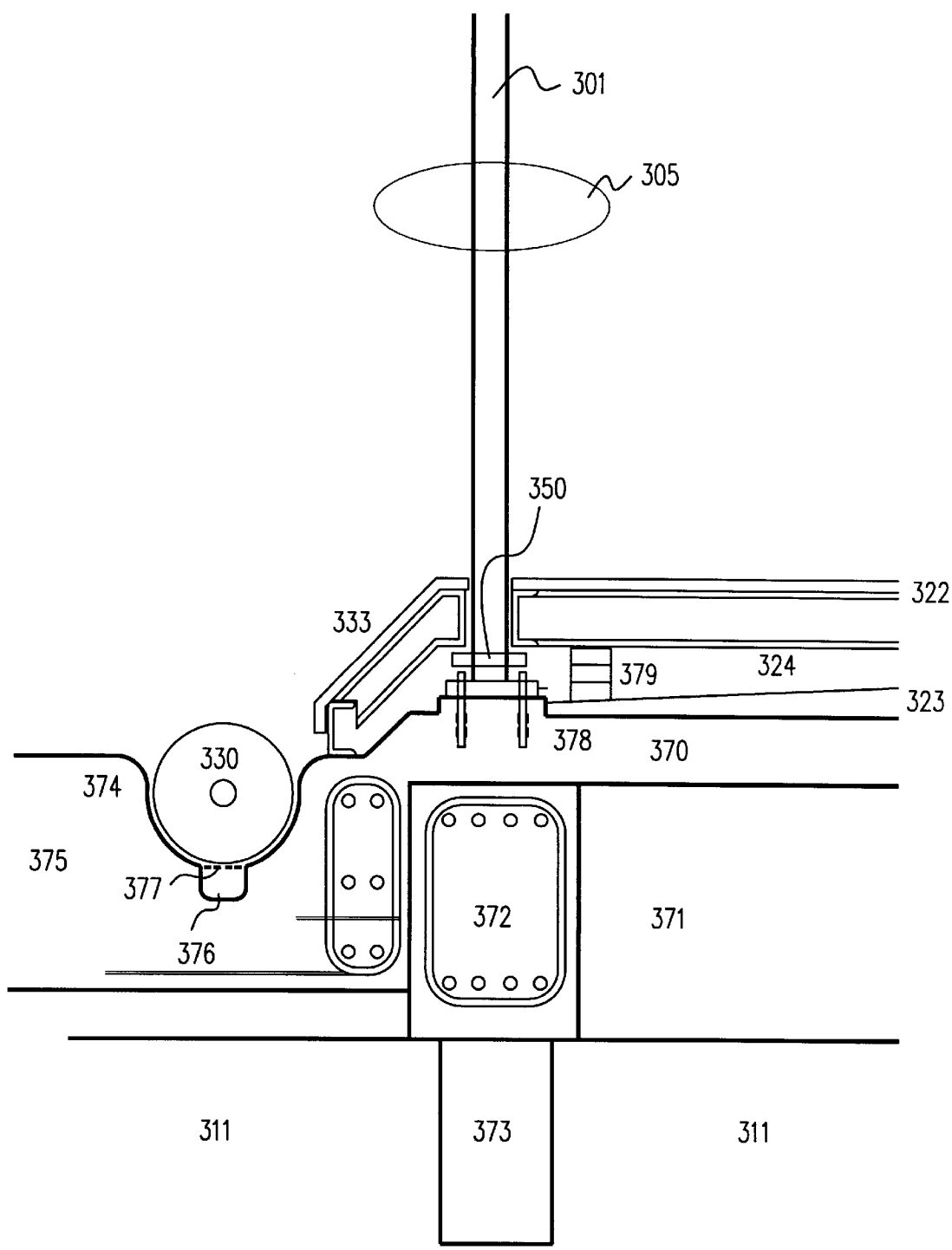
Fig. 4  Section through floor of large scale system

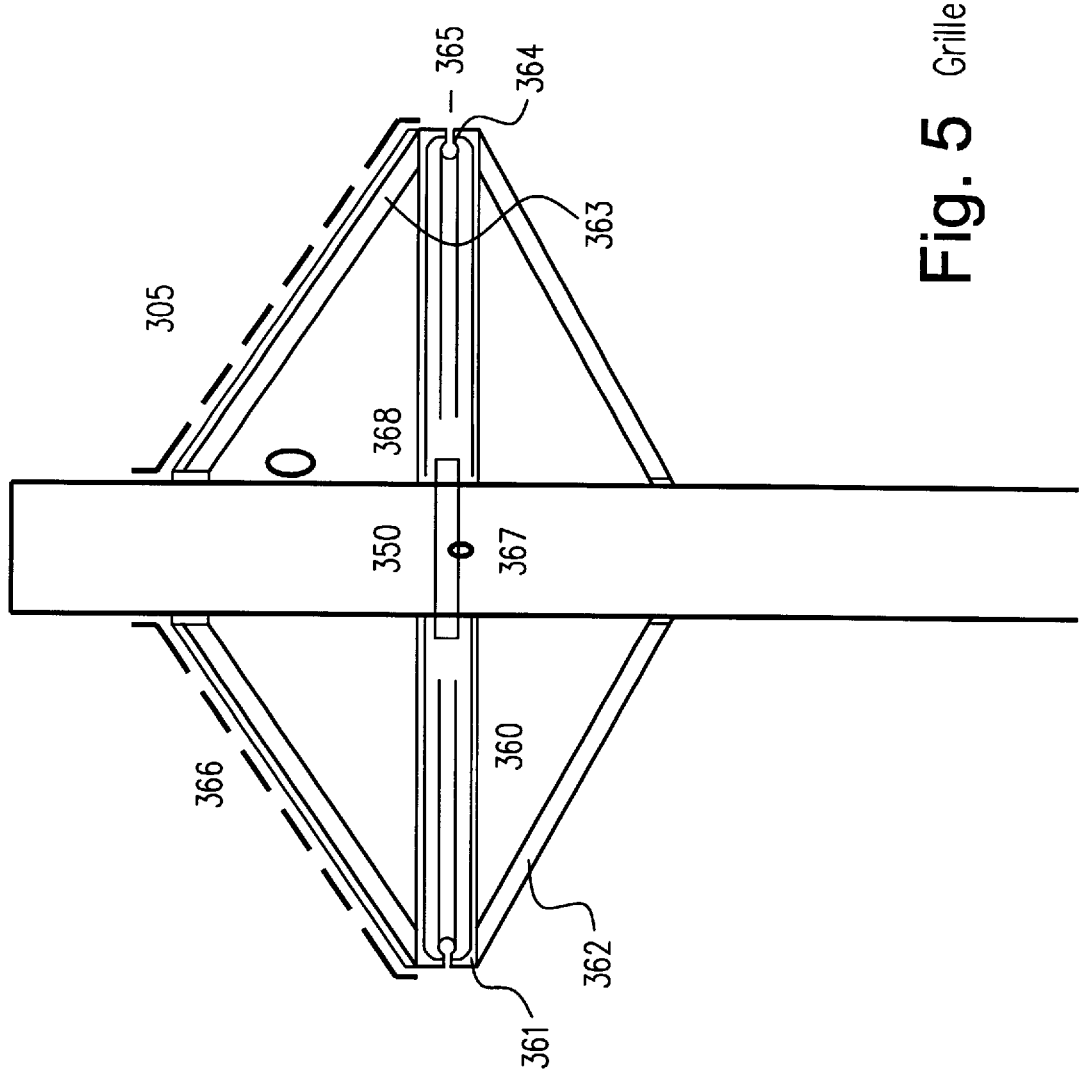
Fig. 5 Grille protection at outlets

SBS MASS TREATMENT SYSTEM

The present application is concerned with the treatment of any permeable mass of materials, gathered for that purpose, within a containment including products, minerals, waste and refuse, arising from domestic/municipal/industrial/commercial and agricultural sources, including excavated soils, using physical and/or chemical and/or micro biological processes to diminish the physical volume and/or to isolate, diminish or remove, metabolise change or otherwise modify, noxious chemical and microbial species contaminating or contained within the mass of such materials.

The present invention arises out of a development of the SBS Close Lance System described in UK Patent Number 22808035 which is particularly, but not exclusively, concerned with the in-situ bio-remediation of soil, in which micro-organisms and other means are used to degrade contaminants in soil and by such means physically degrade the materials under treatment to reduce the levels of contamination within them.

The SBS system administers resources required to engender a variety of biotic and/or abiotic reactions within the soil mass. It can be engineered to include means of increasing the nutritional value and reactive potential of those resources in respect of the microbial populations and chemical species utilised in the reactions.

There are number of known ways of removing contaminants from a permeable mass, each of which is known as a migratory pathway. These include:

direct suction, direct pumping of free flowing fluid contaminants including contaminated fluids and leachates.

leaching infusing another fluid to displace a contaminant and make it available for extraction by forced ejection, direct pumping or other means.

solubilisation dissolution of the containment in a polar or non-polar solvent infused for the purpose of leaching volatilisation removing volatile fractions of a contaminant by passing air through the contaminated mass.

bio-remediation removing contaminants by micro-biological means in which soil resident microbial populations of fungi, bacteria and yeasts are encouraged desorb the pollutant from any substrate, and or metabolise the contaminants to obtain energy for their own life functions. In so doing the contaminants are respectively, either, removed from the substrate, and delivered to the advective flow of a leaching medium or changed into new chemical species which are generally innocuous.

The SBS system as described in Patent No. 2280835 exploits all of these pathways using a piped network including soil penetrating lances through which pass fluids at sufficient volume and pressure to impinge up on a series of overlapping volumes of soil be means of soil penetrating lances. The system caters for the selective, timed and repetitive distribution of defined quantities of key resources necessary to exploit those migratory pathways.

In this application the merits and practicalities of the SBS system are extended to the treatment of a variety of such materials and substances where they exist or are gathered in one place for the purpose of such treatment.

The use of biotic solutions for the continuous treatment of leachate from all forms of processes including landfill leachate is already common practice. Moreover the chemical treatment of liquid industrial wastes in continuous end of pipe treatment systems are also well known. Indeed the treatment of industrial leachates afflicted with inorganic pollutants is often dealt with by continuous treatment involving wholly chemically induced abiotic solutions. All these are accepted as being part of the prior art and do not themselves form a part of this patent application.

In this application the term:

Controlled waste. shall means waste described as controlled or hazardous waste in the Environmental Protection Acts and Control of Pollution Acts and any statutory instruments made under those enactments.

Forest products shall mean timber or any material derived from timber or the fibres or particles of timber.

Indexing Manifold shall mean a device which has the ability to divert key resources passing through a supply hose, to one or more selected lance at a time and which is under the control of the SBS control unit as disclosed UK Patent Application No. 2 320 081 A published Oct. 6, 1998.

Key resources shall mean the plurality of fluid biotic and abiotic resources required for the promotion of the biotic, abiotic or other physical and chemical processes initiated by use of the SBS system including, but not exclusively, compressed gasses, liquid innoculums containing a variety of chemical species and or viable biotic organisms, and gas blown particulate matter which may also be biotic or abiotic.

Lances, shall mean a hollow tubes with outlets described in UK Patent No 2280835 as a soil penetrating lance. In this invention such lances shall be considered as part of the piped network used to penetrate any treatable mass of remediable materials.

Outlet shall mean an orifice upon any part of the piped network described in UK. Patent No 2280835.

Piped network shall mean a system of interconnected pipes controlled by valves each controlled by the SBS system according to UK. Patent No 2280835 by now provided in the present invention to convey key resources to individual volumes of a treatable mass of remediable materials gathered within a refillable containment.

Protocol shall mean the detailed design and application of any particular treatment.

Remediable materials or Remediable mass shall mean any substance or mixture of substances gathered into or occurring as a permeable mass, in liquid, particulate, granular or any other physical form where the individual components of the mass are independently mobile in the widest possible sense and which are, in whole or in part, susceptible to transformation into any number of other substances or biotic organisms, by reason of biotic or abiotic processes.

Refillable Containment shall mean a container or confined volume of space of any size, purposefully constructed on over or under the ground or floating in or on water, in man made or occurring naturally space including, but not exclusively, mines, quarries and caves, with or without a roof or cover, which is suitable for the containment of remediable materials during treatment and which may be filled, emptied and refilled on a batched or continuous basis.

SBS Unit will be used hereinafter to mean the central control unit 22, within the piped network as described in Patent No. 2280835.

SBS System will be used hereinafter to mean the whole of the system described in UK Patent No 2280835.

Treatable mass shall mean any quantity or remediable materials which is gathered in one place for treatment by the present invention.

Treatment shall mean any treatment designed to diminish the physical volume of the remediable material and/or to isolate, diminish or remove, unwanted chemical species contained within the mass of remediable material by the administration of biotic and abiotic resources on a timed and repetitive basis.

Void space shall mean the empty space between particles or articles or remediable materials.

Void ratio shall mean the ratio of void space to the volume of remediable material enclosing that space.

Zone of influence shall mean the volume of remediable materials directly affected by the release of key resources from an outlet upon the piped network.

Waste minimisation through recycling, re-use and recovery is becoming an increasingly important issue for both environmental and financial reasons. This is witnessed by the UK Government's current efforts to ensure that 25% of controlled waste is composted by the year 2000. Waste sorting at source is the fundamental of efficiency in any materials reclamation system but on the macro scale success is dependant upon mass participation. So it is inevitable that recovery and recycling from mixed waste will continue to form a substantial activity well into the future. Clearly there is a need for an accelerated form of economically viable recycling which is not dependant upon high energy input. Even waste that is pre-sorted may require treatment by the system and method described in this invention. Additionally it is acknowledged that any compost resulting from a degraded mass of mixed materials may contain chemical species normally considered to be contaminants if that compost was to be disposed of directly onto virgin soil.

The disposal of noxious wastes generated in industrial process, such as wastes from complex chemical processes involved in manufacturing industry, is also a matter of concern. Some of these wastes require high temperature destruction which itself can create airborne and other hazards as well as consume significant amounts of energy.

Contaminated land is also a current governmental concern because it poses an increasing threat to society through a number of pathways particularly the contamination of water supplies, controlled waters and airborne particles. It compromises the reuse of some brown-field sites and increases the cost of redevelopment. The treatment of contaminated remediable materials like the treatment of soils, is an important issue for health reasons and because contaminants may pass into one of the environmental media air water or land once they are deposited to landfill.

New regulation and guidance on contaminated land are expected in the New Year 1999 with the full effect being felt in earnest by the year 2000. It is clear that the first targets of Local Authorities implementing Section 57 of the Environmental Protection Act 1990 will be old closed landfill sites. So here at least, though not exclusively, the remediation of waste, landfill and contaminated land become intertwined.

Nearly all substances, except inert elements may be chemically changed by treatments involving abiotic chemical reactions. Many substances, notably but not exclusively, organic materials, can be degraded using biological organisms to achieve both chemical and physical change. It is a Darwinian truth that no matter what process is required there are any number of naturally occurring microbial agents which will, most often, be available to facilitate the degradation process provided always that the appropriate subsurface environment is maintained and sufficient resources are provided. All such processes can involve a number of abiotic as well as biotic reactions in the process. Composting is a form of aerobic biodegradation and together with abiotic oxidation provides two of Natures most effective recycling systems. And these are systems which will propel themselves at ambient temperatures.

The importance of temperature control and oxygen content in the context of composting are both already well known but there must be a form a control capable of initiating, sustaining and managing the process if it is to be economically viable.

The inventor has appreciated that the economic effectiveness of the SBS Close Lance system described in UK Patent Number 2280835 lies in its capacity to regulate and deliver a supply of key resources to all volumes of a treatable mass where the utilisation time for resources at ambient temperatures, exceeds the time taken to infuse those resources into the mass. This single aspect is the central tenet of the SBS system.

It applies to all uses of the system irrespective of whether those resources are abiotic or biotic and whether they are utilised within the treatable mass by abiotic or biotic means be they aerobic or anaerobic.

The SBS system is also based upon the following additional principles:

Micro florae often take a much greater time to consume resources than it takes to infuse those resources.

A finite volume of a treatable mass has finite volume of voids space within it.

Simultaneous treatment of all volumes obtains the shortest possible remediation time.

Orchestrated differential air pressures induce controllable fluid cross-flows within a treatable mass Fluid cross flows tend to eliminate pockets of inactivity within a treatable mass Measured intervention offers greater predictability.

Automation assures consistent treatment.

Shared resources provide economies of scale.

Remote control reduces operational costs.

Moreover the Inventor of the present invention has also long realised that if the degradation of remediable materials under normal circumstances, such as in landfill, is so limited due to the sub-surface environment, then by altering the subsurface environment artificially, one can expect a significant number of bio-chemical process to occur during a suitable period of treatment. Irrespective of the material being treated or the protocol being employed, the present invention allows the treatment of all manner of materials en masse, without the expenditure of inordinate amounts of energy.

Accordingly the Inventor has appreciated that where the time taken to utilise resources at ambient temperatures exceeds the time taken to infuse those resources, any remediable materials may be treated by composting, aerobic, anaerobic, enzymatic and abiotic means wherever those materials are gathered together, within a prepared containment, specifically fitted with the SBS system including a piped network to convey resources from sources of supply and distribute them into a remediable mass.

The containment can be any size commensurate with the mass flow of material to be remediated and the time frame in which remediation is required.

Withdrawal of degraded or composted material may be achieved by a number of devices dependant upon the material remediated. In the case of solid waste archemedean screws fitted in channels in the bottom of the containment offer one of several convenient solutions. Others suitable devices include belt conveyors with scrapers as well as gravity chutes. Withdrawal may be on a batched or continuous basis depending upon the circumstance of any given installation.

Such a containment can be used to apply a wide range of protocols from, the aerobic biodegradation of municipal waste, to the anaerobic treatment of coal or semi-fluid ore emulsion using a bacillus such as desulphovibrio within an anaerobic environment to remove sulphur. The aerobic treatment of drilling muds to remove hydrocarbons using micro florae from the pseudomas group of micro florae is yet another application. Purely abiotic treatments are also tenable and potentially viable provided that the central tenets of SBS technology are observed.

In that sense the inventor has appreciated that the possible applications of the SBS system may be biotic or abiotic and even though those processes can be multiple and multifaceted, the basic physical concept of the present invention remains the same. This is because the design of the hardware, injection point spacing, is a function of the hydrology and gas permeability of any given treatable mass whereas the treatment protocol is a function of the chemistry of that treatable mass.

When considering the practical uses of this invention, the inventor foresees the principal but not the only, use, to be in the mass degradation of municipal and industrial and commercial wastes. The treatment of remediable materials by the present invention and method can not only assist primary degradation by occasioning physical and chemical decomposition by biotic activity but can also serve to decontaminate the resulting compost. That purpose it therefore used here as the model to demonstrate the practical utility of the system. However the inventor does not visualise it as its only use.

It is known that much Municipal/Industrial/Commercial/Agricultural waste, in fact many kinds of mixed waste, can have a high volumetric content of naturally degradable substances. Where landfill is laid wet bio-degradation is possible in some degree, Bogner and Spokas 1993. Even so estimates of the time taken to fully degrade municipal waste in wet landfill range up to 300 years. Paper and even foodstuffs have been found to be non-degraded 20–30 years after deposit. Newsprint 30 years old has been found still legible.

The natural bio-degradation of such waste consigned to landfill waste has three basic stages of degradation. These are, the aerobic, the acidic anaerobic and the neutral anaerobic. Many such degradable materials deposited to landfill soon settle and compact under their own weight. Aerobic microbes quickly utilise the available oxygen and very soon this creates an anaerobic environment within the deposited mass. Accordingly the aerobic stage only lasts about one week, now anaerobic conditions prevail.

Many mixed remediable materials, municipal waste in particular, can be high in volume but relatively low in density, taking up much landfill space and transport capacity which are both a limited resource. Consequently much energy is used in compressing the refuse before deposit to landfill. The very process of compression serves to further limit the oxygen content of the waste and further reduce aerobic activity. As soon as the aerobic conditions have been eliminated anaerobic activity commences. Accordingly aerobic activity in the composting of landfill waste and the degradation of contaminants within that waste, is just not available as a significant mechanisms of degradation under current landfill practise.

Not surprisingly only anaerobic bio-degradation is recognised as a significant factor in landfill stabilisation. But anaerobic degradation can literally take hundreds of years before the site is truly fit for alternate economic use. Moreover anaerobic degradation is also potentially troublesome as it can give rise to certain adverse side effects. These adverse side effects are notably the creation of toxic leachates often high in ammonia and having a high biological oxygen demand. Moreover in third stage of degradation, neutral anaerobic, methanogens can also populate the mass. Significant methane production can often last for up to 40 years.

Because of increasing environmental awareness in the 1970's 'dry landfill' regimes have been common since the early 1980's. Such techniques were introduced in part to overcome the issue of toxic leachates high in ammonia and BOD which arise naturally from such anaerobic environments. But dry sites have now been shown to exhibit, minimal, if any such degradation. Thus we can now expect modern landfill to remain more-or less indefinitely. Estimates of time scale for full stabilisation range up to 800 years.

Not surprisingly the search is now on for a satisfactory system which promotes biodegradation but avoids the issue of toxic leachates. The present invention is intended to fulfil that role.

Another significant difficulty for present landfill techniques arises from the fact that some very common substances are wholly resistant to anaerobic degradation. Where such substances form a significant part of the deposited mass this becomes an important issue. One specific substance in this category is lignin. Lignin is a constituent of timber and therefore Forest Products which includes paper and cardboard. Lignin forms up to 18% of timber and as much as 27% of newsprint and other less refined forest products. It has also been shown that Forest products contribute up to 60% of landfill waste in one form or another, with 41% of municipal waste in the form of cardboard and paper. Barlaz et al. 1990. Moreover it shrouds much of the cellulose and hemi-cellulose associated with it. In consequence much of this material also cannot degrade anaerobically. Forest products therefore contribute about 30% of volume to the final mass after degradation has ceased.

At the same time forest products are the major source of cellulose and hemi-cellulose which between them contribute up to 91% of the methane potential of during the third or anaerobic neutral stage of landfill degradation. Whilst there is commercial interest in methane production it only happens in the third stage of natural degradation and it is not practical to turn every landfill into a methane producing unit. Accordingly much of that which is spontaneously produced is simply released to atmosphere. At the same time carbon dioxide is produced. Of total emissions from landfill it has been found. O'Learly and Walsh 1990, that 49% is carbon dioxide and 51% methane. However it should also be remembered that methane is 25 times more damaging as a greenhouse gas than carbon dioxide, Rohde 1990, and whilst landfill can act as a carbon sink, methane production would seem to offset the benefits over the longer term.

If municipal waste was first composted under an active aerobic recycling system the bio-chemical balance of the mass would not reach the anaerobic stage for some time. During that time the lignin could be anaerobically degraded. By removing the lignin in aerobic circumstances, the cellulose and hemi-cellulose associated with it would also be released to be degraded aerobically or otherwise. In this way the final mass would be reduced by up to 30% for that element of waste alone with a significant saving in landfill space, to say nothing, of its economic potential for recycling the resultant compost as a soil improving agent. The potential for methane production would also be much reduced.

Because Lignin is such a significant problem and, in economic terms, time is of the essence, the Inventor has also appreciated that there will often be a need for the introduction of specific degenerative agents into the process to assist in the aerobic degradation of some substances including but not exclusively forest products. These may agents may be biotic or abiotic. However the inventor has also realised that fungi are particularly useful in the degradation of forest products and many other substances. The True Dry Rot Serpula Lacrymans is an ideal candidate for the role. The lignin degrading white rot Phanerochaete Chrysosporium is another as are the timber degrading brown rots such as Gloeophyllum Trabeum.

Measurement of ion concentrations in test blocks have shown substantial chemical changes in affected timber within seven to fourteen day of being inoculated. So response to seeding with spoor and subsequent colonisation can be relatively swift. Thus as an aid to the degradation of Lignin and other constituents of the Forest Products, the True Dry Rot, Serpula Lacrymans, has much to offer. It has also been demonstrated that The True Dry Rot, can grow, expand in terms of diameter, at the rate of 20 mm per day from a viable spoor, once established.

The True Dry Rot thrives at a substrate moisture content of around and below 22%. By coincidence this is the same as the moisture content of Dry Landfill as estimated by Augenstein 1992 and the same would be true of waste materials loaded directly into a roofed treatment containment. However Augenstein also estimated paper in dry landfill as having a moisture content of 20% and timber 15%. All are within the operable range of Serpula Lacrymans which has the ability to transmit moisture and nutrients through its hyphae in order to even out its supply of these resources. Those hyphae can grow as thick as a finger and will penetrate masonry. Paper waste and plastic bags would present no difficulties especially as they can be mechanical shred before final deposition. Moreover Serpula Lacrymans thrives in a warm dark places. Optimum temperatures for growth lie between 21° C. and 25° C. and such temperatures are often exceeded with a composting environment. However it still needs an oxygenated atmosphere. If it did not it would already be devouring timber in existing landfill all over the world; and much else besides, Fungi, including Serpula Lacrymans and the timber degrading brown rots such as Gloeophyllum Trabeum, as well as white rots such as Phanerochaete Chrysosporium, can all be cultivated and spoor collected for use in 'seeding' the treatable mass. The spoor of the True Dry Rot, for example, is a very fine brown dust. Each viable spoor can develop into a separate active organism. It is freely available from timber treatment specialists who are removing it from buildings on a daily basis. Not only is it easily obtained it could just as easily be blown into the treatable mass with the injected air supply or applied directly as the waste was being deposited in the containment. So 'seeding' the mass is not a problem from an engineering point of view and could be controlled by the SBS system where it introduced to the piped network at an appropriate point.

At the same time that imported or naturally arising fungi assist with the degradation process other aerobic biotic organisms, aerobes, will also be functioning, adding to the overall biological oxygen demand. That demand must be satisfied in one way or another if the process is to continue.

The answer is to inject, inter alia, compressed air to act as a nutrient, to expel the gaseous products of prior degradation and to help control the temperature of the mass.

At the same time there will be a need for the measured infusion of fluid or particulate nutrient innoculums to balance the food supply upon which the active micro florae rely. Such innoculums can also be blown in and following such infusion with compressed air will assist in their dispersal within the remediable mass.

The basic idea any biological remediation processes is to feed the micro florae being promoted all the resources they need, except those resources which they can metabolise from the pollutant or substance one wishes them to degrade. The infused gas and most often will also acts as a nutrient unless the protocol required a process requiring the use of an inert gas such as argon, however unlikely that may be. In general terms one would expect air to be used for aerobic systems but carbon dioxide or methane can be used for anaerobic systems although they would not be the only possibilities.

The design of fluid nutrient innoculums is a complex subject in itself. There is abundant research already available to describe the requirements of innoculum designed for the promotion of specific biotic reactions. To be successful the resources required must reflect the same chemical make up or chemical balance of the biomass of the microbes it seeks to support. Such innoculums commonly contain inter alia N, P, K, S, Fe, and trace elements of Cu, Zn, as well as other metals and vitamins necessary all of which are necessary for the promotion of biological activity. Fortunately most microbes have more or less the same requirements which is very convenient.

However innoculums for fungal growth can be different. As an example, the lignin degrading white rot Phanerochaete Chrysosporium thrives in a high manganese II environment. This the organism oxidises to manganese III. The manganese III complexes, oxidises, the lignin, Glenn et. al 1996. So here innoculum design not only needs to support the biological agent itself but also be specific to the degradation of the substrate at hand. Here then is an example of a biological agent facilitating an abiotic reaction. Indeed in the treatment of mixed materials there will be a multitude of other naturally occurring interactions developing in such an environment many of them will be synotropic. Whatever those reactions are and howsoever they are stimulated will necessarily be the subject of further protocol research, and their study will no doubt continue for many years.

The time scale between infusions is a function of the rate of utilisation of key resources and the quantum dispensed at each intermittent injection. The rate of such utilisation can be detected by the measurement of the decline of just one key resource, such as oxygen content. The rate of infusion of other resources can be related to the infusion of that one measured resource by reference to mass balance calculations and a knowledge of the rate of biotic uptake of abiotic resources.

A natural consequence of such treatment, particularly municipal waste, is that many remediable materials would degrade structurally, as well as chemically, albeit that there can be problems associated with municipal waste due to cross contamination, principally from hazardous household products. However the treatment of such materials by aerobic biological means not only assists primary degradation but can also serve to decontaminate the resulting mass by oxidising many contaminants. And there is no reason why treatments should not sequentially engender mutually exclusive regimes. In other words an aerobic regime may be followed by an anaerobic regime, followed by an abiotic regime.

Physical disintegration and decomposition would follow. This would assist other complimentary processes in which inorganic or otherwise recalcitrant fractions of the waste, such as metal fragments, pieces glass, plastics and the like, can be much more easily sorted from the waste stream by conventional means, including but not exclusively, magnetic separation and differential air flow displacement and specialist automated detection, of plastic materials, such as that recently invented in France. Such means do not form part of this application but are complementary to it.

Much of the organic materials in the treatable mass, once satisfactorily degraded, would form a useful compost to be re-used, inter alia, as a soil improving agent, with a lessening of pressure on natural peat. Any organic material which was not sufficiently degraded when withdrawn could be simply recycled to the treatable mass. Inorganic materials would be recycled by known and other means including landfill.

Naturally enough, recalcitrant organic waste, still unacceptably contaminated after treatment, may still need to be consigned to landfill. Nevertheless, it will be in a condition where it was much closer to final stabilisation than when first discarded and occupy a lot less landfill space. Thus precomposting of waste prior to landfill will help avoid the current problems associated with noxious leachates and will shorten long delays before the land can be turned over to some alternate economic use.

Nevertheless where fungi have been used in the process, society at large may be alarmed at the prospect of massive quantities of dry rot and similar being released to the environment. Accordingly once separated, the degraded compost would need to be sterilised or otherwise treated to eliminate any biotic organisms considered to be undesirable in the exposed environment.

Many of the organisms contemplated in this process would be Mesophiles, which are organisms, aerobic or anaerobic, favouring the temperature range 6° C. to 40° C., 43° F. 104° F. So raising the temperature above that level either artificially or biotically would serve to kill many aerobic organisms which develop eagerly during the aerobic degradation process and are then considered undesirable when released to another fate. The Dry Rot organism is a case in point.

However raising the temperature of the mass to 28° C. would be sufficient to kill the organism *Serpula lacrymans* in normal circumstances. To be sure of full eradication that organism from the composted mass it may be necessary to raise the temperature to 35° C. or even 40° C. However if this temperature rise was to be achieved by physically heating the mass it would absorb much energy add to the expense of the operation and damage the environmental credentials of the system.

Yet such temperature rise can be achieved by other means. If, at a suitable point in time, the resultant compost was removed from the containment used for primary degradation, it could be transferred to another containment for a period of stock piling. The act of transfer itself could be utilised to aerate the fraction of the energy required to physically "turn the windrow". This will be effective provided always that individual components of that mass of materials are, in the widest possible sense independently mobile, and can be physically moved by a gas at the administered pressure or are otherwise both porous and permeable.

Moreover the physical disruption and microbial shock would also be significantly less. Accordingly the SBS system would have significant physical advantages over "normal" composting by allowing the use of very deep beds of mixed waste and not seriously disrupting the degradation process during its operation provided always that the injection points appropriately spaced.

However the next question arising is the issue of now the gaseous supply is administered. Should it be continuous or intermittent. In general terms, but not exclusively, it should be intermittent irrespective of the identity of the gas or remediable mass. This because in most protocols especially those employing biotic reactions the continuous infusion of gasses would be wholly uneconomic. A continuous flow of gas would also tend to breach the central tenet of SBS but could be justified in the release of liquid innoculums was intermittent and vice versa.

In the remediation of porous/permeable materials (such as soils) continuous gas sparging has been shown (Hinchee and Ong 1994) to be counterproductive. It was shown in that experiment that over time as the gaseous infusions continne the larger soil pores develop at the expense of the smaller pores. Gas distribution therefore diminishes over time rendering the whole installation ineffective. The same would apply in treating many materials including but not exclusively, municipal waste.

That said, there are other significant practical drawbacks to the continuous infusion of any gaseous resource in that much of the energy and the resource involved is actually be wasted. This is because the power required to obtain horizontal penetration of the gasses to the whole of the contained mass at the same time would imply a supply of such power that it would be uneconomic and environmentally counterproductive. This is because the time taken to refill the voids ratio of the mass is only a small fraction of the time over which biological demand would consume and exhaust those resources to the point where biotic reactions slowed or ceased. So much of the would simply pass through the mass and add nothing to the remediation process.

Moreover in USA based experiments, Hinches and Ong showed that intermittent sparging was a much more effective means of increasing distribution of injected gas in the same media. The effect is probably due to the creation of gas bubbles which act as small stores of the gaseous resource. By the same token infusing an appropriate quantity of gas, suddenly and at an appropriate pressure, deep inside a mass of remediable materials, would also serve to evict the gases which had previously developed in the void spaces. This eviction would be by virtue of gaseous displacement linked with physical connection between void spaces created as the individual components of the mass of the materials were uplifted by the infusion of the compressed gas.

In this way would the porosity and permeability of the mass be increased, albeit only for a limited space of time. Nevertheless in that time the gases would have been exchange and there would be a new supply of nutrients and abiotic resources available to promote and maintain the biotic or abiotic reactions. The intermittent infusion of liquid innoculums could be serviced in the same way by being discharged from the same point simultaneously with the gas.

But high energy input is not the only disadvantage in turning the windrow, it also disturbs the growth of some microbial populations, by inducing physical and thermal shock due to a sudden change of environment. Fungi are particularly badly affected by this process, due in part to disruption of the continuity of the mycelium. This is undesirable as fungi are among the most efficient microbial entities capable of breaking down lignin. Thus disturbance of the windrow, however necessary in that system, actually lessens the efficiency of the process and therefore increases the cost.

By contrast the SBS system can be used to evict those same gases from a zone of influence, even in a deep bed of dense materials, by releasing into a given volume of a treatable mass, an appropriate quantity of a compressed gas at an appropriate pressure. Such action by compressed air or other gas would take only a fraction of the energy required to physically turn the windrow. This will be effective provided always that individual components of that mass of materials are, in the widest possible sense independently mobile, and can be physically moved by a gas at the administered pressure or are otherwise both porous and permeable.

Moreover the physical disruption and microbial shock would be significantly less. Accordingly the SBS system would have significant physical advantages over normal composting by allowing the use of very deep beds of mixed waste and not seriously disrupting the degradation process during its operation provided always that the injection points appropriately spaced.

However the next question arising is the issue of how the gaseous supply is administered. Should it be continuous or intermittent. In general terms, but not exclusively, it should be intermittent irrespective of the identity of the gas or remediable mass. This because in most protocols especially those employing biotic reactions the continuous infusion of gasses would be wholly uneconomic. A continuous flow of gas would also tend to breach the central tenet SBS but could be justified if the release of liquid innoculums was intermittent and vice versa.

In the remediation of porous/permeable materials, such as soils, continuous gas sparging has been shown, Hinchee and Ong 1994, to be counterproductive. It was shown in that experiment that over time as the gaseous infusions continue the larger soil pores develop at the expense of the smaller pores. Gas distribution therefore diminishes over time rendering the whole installation ineffective. The same would apply in treating many materials including but not exclusively, municipal waste.

That said, there are other significant practical drawbacks to the continuous infusion of any gaseous resource in that much of the energy and the resource involved is actually be wasted. This is because the power required to obtain horizontal penetration of the gasses to the whole of the contained mass at the same time would imply a supply of such power that it would be uneconomic and environmentally counterproductive. This is because the time taken to refill the voids ratio of the mass is only a small fraction of the time over which biological demand would consume and exhaust those resources to the point where biotic reactions slowed or ceased. So much of the infusion would simply pass through the mass and add nothing to the remediation process.

Moreover in USA based experiment, Hinchee and Ong showed that intermittent sparging was a much more effective means of increasing distribution of injected gas in the same media. The effect is probably due to the creation of gas bubbles which act as small stores of the gaseous resource. By the same token infusing an appropriate quantity of gas, suddenly and at an appropriate pressure, deep inside a mass of remediable materials, would also serve to evict the gases which had previously developed in the void spaces. This eviction would be by virtue of gaseous displacement linked with physical connection between void spaces created as the individual components of the mass of the materials were uplifted by the infusion of the compressed gas.

In this way would the porosity and permeability of the mass be increased, albeit only for a limited space of time. Nevertheless in that time the gases would have been exchange and there would be a new supply of nutrients and abiotic resources available to promote and maintain the biotic or abiotic reactions. The intermittent infusion of liquid innoculums could be serviced in the same way be being discharged from the same point simultaneously with the gas.

Accordingly a system of intermittent sparging of measured resources which responded to the demands of the various biotic and abiotic reactions within the mass and which infused a measured quantum of resources calculated to fill only the voids ratio of that mass and satisfy those demands within the volume of influence of each injection point, offers the prospect of an economic solution.

Within an embodiment of any basic design according to this invention, the soil penetrating lances, 22, described in UK Patent Number 2280835 can now develop to become permanent columns within the containment. These columns are set out to a design grid calculated to provide overlapping volumes of influence about each intersection on that grid.

Grid or lance spacing, S, is, usually but not exclusively, found by the formulae S=square root of . . . $2R,^2/2$, where R is the radius of zone influence of a gas at a given pressure within a given mass.

The principle of intermittent infusion of resources through such columns, together with the need to have an economically significant zone of influence around each injection point, lends itself very easily to yet another new concept; permitting a store of key resources to be accumulated at an appropriate pressure, immediately adjacent or close to the point of release. These resources would most often, but not exclusively, be held and discharged at above ambient pressure.

From this concept arise the notion of using pressure vessels, charged over time with the appropriate gas, being connected into the piped network, physically positioned relatively close to the point where they are required to be released in that they would be closer to that outlet than the source of the key resource they were intended to hold. When released these volumes of compressed gas would be emitted over a relatively short period of time. This would increase the power of the output sufficiently to force the gas out through the mass of remediable materials. In this manner the zone of influence of each outlet would be extended to encompass a larger volume than would otherwise be the case were no pressure vessel provided.

From that concept arises the prospect of utilising structural members comprising the structure of a containment which are used both as structural supports and as pressure vessels for the storage of gases and other fluid resources.

The columns could thus be as pressure vessels come lances in their own right. Outlets could then be fitted in the walls of those members and controlled by valve mechanisms remotely operated by the computer at the heart of the SBS system. At the same time they could, continue to perform a structural function within the containment such as supporting other structural elements including, but not exclusively, the roof or input distribution system plus the piped network and other services.

Where there are regulatory or other objections to using the structural members of the containment as part of the piped network, pressure vessels could be installed separately either within the space within structural members protecting the outlets or within the void space above the treatable mass. Supporting pressure vessels upon the space frame holding the roof would also be quite feasible. These could be separately connected to the piped network and similarly operated having valves which open under the remote control of the computer at the heart of the SBS system.

But there also needs to be a systems which permits even and equal distribution of those resources in the immediate vicinity of the point of release. This is necessary to ensure the maximum efficiency in the use of those resources within the treatable mass. There is also a need to ensure that columns/injection points deployed upon a widely spaced grid are able to provide access to a sufficient zone of influence such that it overlaps with its neighbour. The outlet points also need to be protected against clogging by individual components of the treatable mass.

Accordingly the inventor contemplates a further development by surrounding those outlets from the piped network with perforated cages. These would protect the outlets from being clogged and to allow an even spread of the gas over a wider area. Such a feature would extend the zone of influence of each outlet and make even dispersion of the dispensed resources throughout the mass much more probable. This is especially true for gases if the outlets were to be engineered to allow an uninterrupted zone of protected space around the outlets and within the mass through which sudden releases of gas could dissipate equally in all directions.

But any such cages would have to be built such that the remediable mass could flow around them, albeit slowly, as the degradation process continued. This suggests, to the inventor, the need for umbrella shaped cages with the upper surface rising at an angle greater than the internal shearing resistance of the remediable mass; again an angle of at least 38° above the horizontal would normally be adequate. Each cage would be covered with a strong perforated material capable of supporting remediable materials loaded from above, and passing gases into the mass both above and below. These would be fitted to columns above and around injection points, all supported by struts off the same column from beneath, see FIG. 4, Leaving the lower face open and not covered with perforated sheeting would allow any smaller items of the mass to drop though. Repeated releases of gas would keep the volume falling or flowing back under the umbrella like cages relatively clear, of the outlets themselves.

A zone of influence commensurate with the pressure and flow of the resources as well as the permeability of the remediable materials would develop around each outlet upon the piped network each time the outlet is operated to allow resources to flow in or out of the outlet.

The cages themselves would become buried in the remediable mass and would need to be designed to withstand the multitude of static and dynamic pressures the mass would exert upon them. Nevertheless they could be engineered to allow maintenance by specialist devices/vehicles, or other mechanisms, depending upon the scale of the installation. The system could be engineered to allow sufficient space between them so to allow the maintenance devices to pass between them. In this way the engineering could ensure that there was no conflict when circumstances required the containments to be fully cleared out from time to time.

The cages would also be ideal sites for the mounting of any sensors to measure technical data such as, but not exclusively, temperature, oxygen content, Redox potential, pH.

The question now arises as to the frequency of such outlets in the vertical plane. Experiments by Boresma et. al in the USA, using neutron probes, have demonstrated that the isogonals describing the pressure distribution of sparged gasses within the phreatic zones, soil below the water table, are more or less heart shaped. In other words they do not describe an inverted cone where the pressure at the upper level of the soil mass is the same as within the cone. The corollary to such findings is that within a deep bed of treatable mass a plurality of outlets and cages as described before would be required. These would be evenly spaced throughout the depth of the mass plus a similar device at the bottom of each column which may be of an alternate design.

It is quite common to find the permeability of soils on the X—X axis and the Z—Z axis to greater than permeability on the Y—Y axis by a factor of 10. The same can be expected of any layered mass. The frequency or vertical spacing between the outlets would depend upon the vertical permeability of the mass which the containment is constructed. Accordingly the vertical distance between outlets can generally be expected to be less than the horizontal radius of zone influence. However that would be a matter of site specific application and design.

Withdrawal of composted material may be on a batched or continuous basis depending upon the circumstance of any given installation.

The Inventor has now assembled a combination of all these aspects and ideas and has contrived the vision of a refillable containment of any size, capable of retaining a mass of remediable materials, constructed to include a piped network, as revealed in UK Patent Number 22808035 but incorporating permanent or semi permanent columns instead of soil penetrating lances, 22, as part of a piped network.

The said columns would be spaced out on a rectangular grid the spacing being a function of the permeability of the remediable materials to be treated within the refillable containment. Said columns may be hollow and may be used to support the roof and any other appropriate structural part of the containment and associated ancillary equipment including any system required for the distribution of remediable materials about the containment.

Each column within the containment may be contrived as vertical pathways for the piped network and have at least one controllable outlet upon the piped network associated with each such column. A plurality of outlets to the piped network may be mounted upon each such column within the containment.

The piped network is connected between a set of sources of key resources at an end thereon and a plurality of outlets to the piped network at each other end thereon.

Whatever the specific purpose of any individual protocol or management practise used in conjunction with this invention the system and basic method of inducing those interactions will always be the same and involve the measurement and distribution of defined quantities of fluid or particulate resources on a timed and repetitive basis throughout the remediable materials held within a refillable containment.

Each such outlet from the network to the remediable mass may be protected by a performed cage extending the radius of the zone of influence of that outlet and allowing an equal distribution of gases out into the treatable mass deposited around it. These devices, cages, could also house the means of distribution of blown particulate matter required to 'seed' the biotic reactions, e.g. spoor of the Dry Rot Fungus and the like, as well as sparge pipes for the infusion of liquid nutrient innoculums.

Any structural member forming part of the supporting framework of the containment may be a hollow structure. Any such hollow structural member may be connected into part of the piped network and act as part of the piped network. Any such hollow structural member may also be a pressure vessel connected as part of the piped network. Any appropriate structural member may support a pressure vessel connected as part of the piped network.

On the smaller scale treatment of remediable smaller quantities of remediable materials may be achieved using an SBS system unit installed to a serve an array of small refillable containments. These might be the size of standard transport containers or even less depending upon the specific application.

On a contrasting scale one may contemplate an installation covering say 1 hectare built of concrete 20 meters deep excluding the roof and access depth. The roof supporting columns could be provided on a six meter grid, and also act as injection points. The capacity of such an example would be 200,000 cubic meters.

For such a large containment to be considered feasible the inventor feels a need, to demonstrate its practicality in terms of current building construction capability. The dimension of 20 meters has been chosen as it is a standard blast face depth within a quarry and 6 meters between columns is a standard grid dimension for the construction of steel framed structures. Such dimensions therefore realistically describes the possibilities which current technology and practise represent.

In such a facility a principal limiting factor would be the strength of the floors, which would themselves be limited by the compressive strength of concrete. A containment 20 meters deep full of composted material having a specific gravity of 1.8 would exert a compressive stress of 36,000 kg per square meter of floor area. That is a floor loading of 353 kN per square meter where acceleration due to gravity is taken to be 9.81 m/s. The compressive stress upon the concrete would therefore be 353 kN/m$^2$ or 0.353 N/mm$^2$. A C20 concrete to BS 5328 having 250 kg of super sulphated cement per cubic meter would provide concrete expected to obtain a compressive strength of at least 20 N/mm$^2$ in 28 days. Such a concrete would be allowed a permissible working stress of 7 N/mm$^2$. Accordingly such a construction is well within the competency of current concrete technology.

For maintenance purposes it would be beneficial to construct any space frame supporting the roof such that any two adjacent columns could be removed without structural overload. Space frames spanning 18 meters in two directions are perfectly feasible.

Compressed gas may be infused at controlled rates and pressures into the matrix of the treatable mass to achieve the same effect that turning the windrow accomplishes but without excessively disrupting any fungal mycelium. Again the ultimate loading of 0.353 N/mm$^2$ is to be overcome and describes the limiting factor in this scenario. That translates to a pressure of just under 3.5 Bar. With frictional loss in the pipework reducing pressure by 5% in pipes over 16 mm diameter for every 15 meters of effective length of pipe, compressors working at 7 bar, the lowest normal industry standard, would be sufficient to operate over distances of up to 150 meters effective pipe length. Compressors working at 8 or 10 bar, both industry standard in larger compressors, may therefore be required for larger containments of say 200,000 cubic meters.

In considering the zone of influence about a resource outlet to a column or lance, if one accepts that the tangent of the cone angle about the lance is the reciprocal of the bulk density of the remediable mass then, from Acombe et al., that implies a radius of influence of 4.25 meters about each outlet. This can be achieved in some in situ soils let alone looses waste and granular materials. If protective cage/distribution modules as shown in FIG. 5, having a radius of 1.5 meters, were to be fitted to protect the injection point outlets on the columns then the effective radius is 2.75 beyond that cage. Twice that distance mean that the edges of the cages could be 5.5 meters apart but in practice would be closer because of the 6 meter grid spacing. Accordingly the proposal is both feasible and conservative.

During the aerobic treatment of mixed waste an operating temperature of 22–24° C. would be ideal for biotic reactions to succeed. In the event of the rate of biotic activity becoming over enthusiastic, the risk of a rise in temperature of the biomass sufficient to engender spontaneous combustion cannot be ignored. Nor can the sensitivity of the micro florae being utilised be ignored.

To counteract biotically induced temperature rises exceeding operating norms, the installed system must also be capable of administering large and effectively distributed volumes of water to absorb the heat and prevent excessive rises in temperatures. In this way operators would seek to eliminate the possibility of fires in the permeable mass due to spontaneous combustion.

Such drenching systems could be incorporated in the roof structure as well as within the SBS system or be run parallel to it such that protected outlet points could be used to achieve temperature control from pre-determined points within the treatable mass. The need for such treatment could be sensed by heat detectors/smoke sensors positioned within the mass and protected by the outlet cages described in FIG. 5. Where appropriate oxygen sensors could also be positioned in the outlet protection cages and linked back to the control unit with electrical circuitry passed in conduits alongside or through hollow structural members.

In order to accommodate the effects of the in-rush of large volumes of water as well as natural leachates, within such permeable masses, it would be necessary to install a fixed drainage system in the floor of the containment capable of accepting surplus water at the lowest possible level. The inventor has appreciated that it is possible to form drainage channels built into the sides of the compost recovery systems. Here the channels would be both at the lowest part of the containment system and could be kept clear by the action of the archaemdean screws operating alongside.

Such leachates and water run off would be collected and treated by other known means to remove noxious substances and particulate matter. Once treated the water could be stored in tanks and reused for the purposes of creating innoculumns or future temperature control. Indeed the tanks could be continuously aerated with blowers to promote aerobic remedial action whilst the water is stored.

Similarly, in many situations, the air quality emanating from such processes is likely to be unacceptable for release directly to the environment. Accordingly the inventor anticipates the inclusion of means of removing noxious smells and particulate matter from the off-gases which the process will necessarily create. The use of physical filtration, water washing, electrostatic filtration and the use of activated carbon filters of the air are all contemplated.

Where gas infusion outlets from the piped network are fitted below a suspended perforated floor it will usually be necessary to subdivide the sub-floor void to confine the input of the gas to a given area to ensure that it only affects the appropriate part of the deposited mass. It is not inconceivable in this situation that there may be a need to intermittently seal off the product withdrawal system from areas outside the containment to prevent loss of gaseous infusions by that route.

Consideration is now given to the containment required for such stockpiling as part of the overall treatment system. Such a process would necessarily have to be carried out in a separate containment away from primary degradation so as to simplify the engineering and avoid any risk of spontaneous combustion within the remainder of the treatable mass. That containment would require a means of input, withdrawal and of temperature control, such as integral water cooling pipework passing through and within the mass of compost. Insulating the body of the containment to prevent heat loss would be beneficial in other stages of the process. The specific length of time required for materials to remain in the containment would vary from situation to situation.

There now follows the formal description of the present invention

According to the present invention there is provided a system for the abiotic or biotic treatment of permeable mass of remediable materials, gathered, for that purpose, within a refillable containment, which provides for the dissipation, within that permeable mass, the resources, required to remediate and change the physical and/or chemical structure of that mass, by injection, and/or suction, and/or leaching, said system having a plurality of conduits through which pass fluids or particulate substances that are injected into or removed from the permeable mass via outlets upon said conduits connected to a piped network system, characterised in that, the system selectively measures and delivers defined quantities of the fluids and particulate substances, on a timed and repetitive basis, either simultaneously and/or sequentially to selected individual outlets and/or selected groups of outlets within the plurality of said conduits, said plurality of conduits being set out in an array of more than two and being positioned at intervals in the horizontal and/or vertical plane within the permeable mass.

According to the present invention there is provided a method for the abiotic or biotic treatment of permeable mass of remediable materials, gathered, for that purpose, within a refillable containment, which provides for the dissipation within that permeable mass, the resources required to remediate and change the physical and/or chemical structure of that mass, by injection, and/or suction, and/or leaching, said method having a plurality of conduits through which pass fluids or particulate substances that are injected into or removed from the permeable mass via outlets upon said conduits connected to a piped network method, characterised in that, the method selectively measures and delivers defined quantities of the fluids and particulate substances, on a timed and repetitive basis, either simultaneously and/or sequentially to selected individual outlets and/or selected groups of outlets within the plurality of said conduits, said plurality of conduits being set out in an array of more than two and being positioned at intervals in the horizontal and/or vertical plane within the permeable mass.

The first aspect of the present invention is the construction of a refillable containment, of any size, built or contrived within, naturally occurring or man made space, in on over or under the land or floating on or in water, said containment being provided with an adaptation of the resource delivery mechanism and piped network, as revealed in UK Patent No. 2280835, here provided for the purpose of treating remediable materials gathered within that containment prior to the transfer of the resultant remediated mass to final disposal or some other purpose.

The second aspect of the present invention is that the refillable containment according to the first aspect may incorporate permanent or semi permanent columns or conduits acting in the same way as soil penetrating lances, 22, as part of a piped network.

The third aspect of the present invention is that hollow structural members which are part of the structure of the containment may also be a conduit forming part of the expanded piped network according to the second aspect.

The fourth aspect of the present invention is that where hollow structural members become conduits within the piped network according to the third aspect, they may be themselves be pressure vessels capable of being charged with compressed gas or fluids or blown particulate matter over a period of time such that the contents of the member may be discharged over a much shorter length of time than that taken to charge the member.

A fifth aspect of the present invention is that where hollow structural members become conduits within the piped network, inlets and outlets to that piped network may be formed in the walls of said structural members and fitted with valves to control fluids and blown particulate matter flowing through those inlets and outlets.

A sixth aspect of the present invention is that where inlets and outlets to the piped network are formed within the walls of structural members according to the fifth aspect the members may be fitted with a plurality of valves to control a plurality of such inlets and outlets.

A seventh aspect of the present invention is that where inlets for leachate collection and outlets for fluids, gasses and particulate matter are provided and expected to be immersed within the treatable mass then those inlets outlets shall be protected by perforated grilles suitably constructed to allow for the easy collection of leachate and the sudden releases of fluids gases and particulate matter to be evenly distributed.

A eighth aspect of the present invention is that the grilles according to the seventh aspect shall be of such size and shape as to optimise distribution of the fluids and particulate matter released and to enlarge the radius of influence of any given outlet.

A ninth aspect of the present invention is that inputs of fluid and particulate resources throughout the piped network may be controlled by signals transmitted from an SBS unit, 22, according to UK Patent Number 22808035.

A tenth aspect of the present invention is that the valves controlling the inlets as well as outlets to various sections of the piped network including structural members forming part of that piped network according to the ninth aspect hereof may be widely distributed throughout the piped network.

The eleventh aspect of the present invention is that outputs of fluid and particulate resources throughout the piped network may be controlled by pneumatic, electrical transmitted from an SBS unit, 22, according to UK Patent Number 22808035, or electro magnetic signals generated or controlled by the computer control in an SBS unit.

An twelfth aspect of the present invention is that the distribution of fluid and particulate resources throughout the piped network may incorporate Indexing Manifolds according to UK Patent 2 320 081.

A thirteenth aspect of the present invention is that, where the scale of the operation demands, the refillable containment, according to the first aspect, may be a prefabricated box provided with ports through which lances, being part of the piped network and having a single outlet or plurality of outlets, may be inserted, to penetrate the treatable mass, and be held in position by compression fittings or other fittings capable of both sealing and locking any lance in position.

A fourteenth aspect of the present invention is that the floor of any containment, according to the first aspect, may be profiled or laid to falls to encourage any leachate to fall away from the mass of remediable materials and be directed to a separate drainage system.

A fifteenth aspect of the present invention is that the floor of any such containment may be fitted with a grille to encourage any leachate to fall away from the mass of remediable materials and be directed to a drainage system and or allow compressed gasses to be distributed over a wider area centred upon any outlet on the piped network.

A sixteenth aspect of the present invention is that the refillable containment, according to the first aspect, may be fitted with additional piped systems to exhaust gasses and liquids outside the service provided by the SBS system.

A seventeenth aspect of the present invention is that the refillable containment, according to the first aspect, may be additionally fitted with a sparging system suitable for the timed and repetitive dispensation of fluid or blown particulate innoculums to the upper surface of the mass of remediable materials.

An eighteenth aspect of the present invention is that the refillable containment may be additionally fitted with a system for the removal of composted or remediate materials from the bottom of the treatable mass of remediable materials, such as an archemedean screw or selectively operable hopper and chute system, or conveyor and scraper system.

An nineteenth aspect of the present invention is that the walls roof and floor of the containment whilst not being necessarily imperforate, shall be intrinsically impervious to fluids and gases and provided with sealed but provided with operable closures to any perforation required for the purposes of loading, unloading of for the active treatment of the remediable materials.

A twentieth aspect of the present invention allows that the structural members may support pressure vessels connected to any part of the piped network for the purpose of storing resources including but not exclusively, fluids gases and particulate matter at a pressure greater than 1 bar prior to sudden release.

A twenty first aspect of the present invention allows that sensors, for pressure, airflow, temperature etc. may be fitted throughout the system and connected to the computer controlling the SBS system according to UK. Patent No. 2280835 such as to allow both monitoring and automated decision making in real time.

Embodiments of the present invention will now be described in detail, by way of example, with reference to the drawings which are listed in the following table

| FIG. No. | Description or title |
|---|---|
| 1 | Small scale treatment system for use in semi-permanent structures, container and silos. |
| 2 | Plan of a large scale composting and treatment system |
| 3 | Vertical section of a large scale system |
| 4 | Detail section through the floor of a large scale system |
| 5 | Grille protection at outlets. |

There follows a series of description of alternate embodiments of the proposed invention related to the drawings listed in the table above.

Drawings are not to scale and are for the purposes of illustration only.

The reference numbers for the various elements of the construction of the invention are numbered according to convention. However reference numbers are not necessarily consecutive in first time use in the test. Not all numbers in any series have been utilised.

Reference numbers for components related to the invention described in UK Patent Number 22808035 have been repeated according to that Patent and that numbering system has been maintained.

To avoid confusion with any reference to any numbered component in UK Patent Number 22808035 the numbering of the components of this invention commence at 300.

An embodiment of the present invention involving the use of the SBS system of treatment system to treat remediable materials within a small steel container will now be described in detail and the numbering scheme refers to the detailed numbering on FIG. 1 and to the detailed numbering system used in UK Patent Number 2280835.

The equipment required for the active employment of the SBS system all as described in UK Patent Number 2280835 includes an SBS unit, 22, connected to a compressor, 23, extract or vacuum pump, 24, nutrient supply, 25, measurement vessel, 27, and leachate collection vessel, 26, and electrical supply, 131. This equipment is positioned and properly connected together within a container, 501.

A plurality of refillable containments, 502, are prepared with fixed or loose lances, as befits the circumstance.

Containers, 502, for solid and compressed waste would be charged into refillable containments provided with removable lances. The lances are inserted into the containers, 502, through ports, 511, consisting of a tubular sleeve, 518, held with a weld, 517, through the roof or wall of the container, 500, to receive a lance, 20, secured by an olive, 516, and cap nut, 515, drilled into the roof, 506, or the walls, 507, or the floor, 508, of the containers. Containers, 502, used for liquid or semi liquid wastes may be provided with pre fixed lances, 28, permanently welded in position.

A leachate recovery and pumping system, 509, may be attached to the container, 2, to ensure that all leachate is permanently drained out and recovered for end of pipe remediation by other technologies and recycling. Drainage may be assisted by a grille, 522 laid, to stand above the floor of the container, 502.

There now follows a description of the mode of operation of the present invention.

An SBS unit, 22, is connected to a piped network consisting of hoses, 28, connected to a plurality of lances, 20, set into a plurality of refillable containments, 502. The lances, 20, extend into the containers, 502, such that the outlets to the lances, 20, are positioned to pre-set depths within the materials, 14, within the containers, 502.

The steel containers, 502, are filled with compressed or uncompressed remediable materials, 14.

Lances 20 are inserted into the mass to predetermined depths and connected via hoses to the SBS unit and resource providers, all as described in UK Patent Number 2280835, in the container 501.

The system is activated and the environment necessary for the remediation of the materials is created and maintained within the body of the mass.

Upon completion of the process the containments are discharged. The remediated materials, now structurally degraded are sorted known and other means. Compost is discharged to spoil heaps and allowed to rise in temperature by aerobic biological activity, then to stand and become anaerobic to eliminate any undesirable aerobic microorganisms. Ultimately satisfactory and uncontaminated compost is used for alternate purposes. Unsatisfactory materials are returned to the system for more treatment or are discharged to landfill or other process ready for alternate use.

An embodiment of the use in the ex situ SBS system of treatment system within a large purpose built containment will now be described in detail and the numbering scheme refers to the detailed numbering on FIG. 2, FIG. 3, FIG. 4, FIG. 5, FIG. 6.

FIG. 2, FIG. 3 and FIG. 4 shows schematically a vertical section view of the embodiment of a containment 300, for the gathering of remediable substances, for the purpose of treatment designed to reduce the physical volume of the mass and/or the content of contaminants within the treatable mass, by biotic or abiotic means initiated and sustained by the dispersion of necessary key resources distributed through a piped network, 303, supported by the structure comprising the containment, 300.

The walls of any such containment shall be impervious and have impervious doors, 304, for the purpose of maintenance access, all suitably constructed to withstand the pressures applied by the treatable mass and any other relevant loading.

The containment, 300, is provided with a system of input hoppers, 314, into which refuse lorries, 316, or railway wagons or any such suitable transport vehicles discharge their content of remediable materials through a size limiting grille and or mechanical shredder, 315.

The roof of the containment, 309, is supported upon a space frame, 326, in turn supported on hollow columns 301 which rise from the floor of the containment, 324, providing an operating space, 328, in which travel a system of loading trolleys, 327, capable, from time to time, of the delivery of remediable materials into and or onto the treatable mass, 321, below.

The containment may be founded upon piles, 373, or other foundations with ground beams, 372, supporting impervious reinforced concrete floors, 370, all bearing upon ground formation levels 311.

The concrete structural floor may additionally, but not necessarily support a slatted floor, 322, of sufficient strength to support the anticipated loads imparted by the treatable mass, such that it forms an air space, 324, above the floor of the containment, 370. The air space, 324, is subdivided to confine the released gases to the appropriate volume of treatable mass.

The lowest outlets on the columns 301 are contrived to exhaust into the void space, 324.

The air space 324 may be divided between columns 301 in order to ensure even distribution of gaseous resources discharged at that level.

Slatted floors, 333, may be angled to ensure complete discharge of any remediated mass. In such a case the angle of incline would need to exceed the angle of internal shearing resistance of the remediated material. 38° should be sufficient for most situations involving granular or particulate material.

To assist with the collection of leachate the floors, 370, may be profiled or screeded to falls, 323, to shed leachate brought to that level under the influence of pressure or gravity, into drainage channels, 376, discharging through a drainage system, 325, for collection in treatment/innoculum plants, 319, ready for recycling through the piped network, 303, for re-distribution to the treatable mass via pipework attached to hollow columns 301.

A mechanised compost withdrawal system is incorporated into the structure to remove remediated materials from the treatable mass, 321. A plurality of horizontal screw augers, 330, running in a semicircular channels, 374, cast into a reinforced concrete floor 375 are rotated by an engines, 329 housed in a separate enclosure 310. The rotation of the screw augers propels remediated materials to a collection area, 312, from which they are mechanically removed for onward transmission to alternate process use or final disposal using other known or new technology.

The sources of key resources may be confined with an attached process hall, 313, or constructed outside the containment building altogether as was appropriate to any given site.

The equipment required to provide the power and sources of key resources required for the active employment of the SBS system through the piped network 303 including but not exclusively, compressors, 335, leachate collection, 319, storage tanks, 337, and nutrient tanks, 338, are positioned in a process hall, 313, and connected into the piped network to serve the same functions are described in the specification to UK Patent Number 2280835.

A piped network or a plurality of piped networks, 303, is installed linking the sources of key resources to individual and overlapping volumes of the treatable mass via a system of computerised control as described in UK Patent Number 2280835. However in this invention, rather than being confined internally to a relatively small enclosure of an SBS unit according to UK Patent Number 2280835, the piped network, 303, and the valves controlling fluids passing through that system may be distributed throughout the whole containment as though the containment.

Similar but separate distribution networks may be engineered to provide separate outlets for compressed gases, liquid innoculums, blown particulate matter; essentially fungal spoor, coolants essentially water.

The piped network passes through or incorporates the columns, 301, which now represent and act in similar fashion to the lances, 20, described in Patent 2280835.

Such a piped network or parallel networks together with the associated control valves, as described in UK Patent Number 2280835, and possibly but not necessarily, including Indexing Manifolds, 334, as revealed in FIG. 7 and FIG. 8 hereto, may be located at a convenient level above or below the level of the treatable mass.

The piped network, 303/334, may be supported upon the structure of the whole containment, 300, and the space frame, 326, supporting the roof structure, 309, or sited on the tops of columns, 301, or fitted into the floor structure or within the void space under the slatted floor, 322.

Outlets, 305, to the piped network, 303, are individually controlled by valves, 350. These may be sited at the point of such discharge of such outlet or more remotely as required in each circumstance.

The outlets 305 are protected by cages, 360, having a perforated sheet cover, 366, held at an angle to the horizontal by raking supports 363 terminating at and fixed to the column, 301, at an upper level and to a circular or segmental frame, 361, occupying 360° on plan at the lower level.

The frame, 361, is also further supported by raking struts, 362, again fixed to the frame, 361, at one end and to the column, 301, at a lower level at the other end.

A sparge pipe, 364, with outlets suitable for the discharge of fluid innoculums at regular intervals thereon is connected to the piped network in such a way that it is devoted to the discharge of fluid innoculums into the treatable mass, 321.

There now follows a description of the mode of operation of the present invention.

The mass of remediable materials is loaded into the containment on a periodic or continuous basis via a chute 314 having optionally but not necessarily passed through a shredder and sizing grille 315. The materials are distributed about the containment, 300, by a distribution system, 327, before addition to the treatable mass, 321.

The mass is now treated abiotically and or biotically, aerobically or anaerobically in whatever manner the treatment protocol demands. Treatment is occasioned by the infusion of defined quantities of key resources on a timed and repetitive basis via a plurality of outlets, 305, mounted on mass penetrating columns, 301.

Key resources from the source of those resources, 335, 337, 338, are transported into the treatable mass by means of a piped network, 303, connecting all of the infusion outlets, 305, on the piped network to the sources of the key resources required for any given treatment including compressors, 335, innoculum tanks, 337, and nutrient tanks 338.

The flow of key resources is energised by compressing gases or pumping other fluids through the said piped network, 303, by external means such as compressors, 335, or pumps or pneumatically exhausted vessels connected to the piped network, 303.

Fluid flows through the piped network, 303, are controlled by a plurality of valves fitted to that piped network in similar fashion to the valves on the internal pipework to the SBS Unit, 22, and fully described in Patent 2280835. The valves may be remotely operated by a variety of means, including but not exclusively, hydraulically or electrically or pneumatically.

Indexing manifolds, 334, may be fitted to limit the complexities of the piped network, the associated engineering control systems, reducing the number of computer addresses and programme steps required as well as simplifying the writing of relevant computer programmes.

When the mass is sufficiently degraded and/or remediated to the standard required it is withdrawn by a recovery system, 330, driven by motors, 329, which deposits the materials to drained catchment areas 312. Leachate is continuously withdrawn from the catchment areas, 312, for treatment by other technologies in recycling systems 319. Some materials such as mixed waste may require sorting before onward transport to stock piling, sterilisation and alternate use.

The whole of the treatment system is controlled by computer, 339, optionally, but not necessarily, operated from a control room, 336.

What is claimed is:

1. A system for the abiotic or biotic treatment of a permeable mass of remediable materials, said system comprising:
    a container for holding said remediable materials,
    a piped network system including a plurality of conduits each having an outlet arranged within the container, said outlets being set out in an array which includes different horizontal and vertical planes,
    one or more pressure vessels arranged in the piped network system for storing predefined quantities of resources required to remediate and change the physical and/or chemical structure of the mass under pressure, and
    means for supplying said resources under pressure from said vessel or vessels to each outlet of said conduit or group of conduits on a timed and repetitive basis.

2. A system according to claim 1 which further comprises means to suck fluids and/or particulate matter within the chamber out through the piped network.

3. A system according to claim 1 wherein each outlet is surrounded by a protective grill or cage.

4. A system according to claim 1 which further comprises a means for measuring and said supplying said resources to said container is a programmable computer.

5. A system according to claim 1 which further comprises means for controlling the pressure at which said resources are delivered to said conduits.

6. A system according to claim 1 wherein the one or more pressure vessels are arranged immediately adjacent or in the region of the outlet through which they are to be released.

7. A system according to claim 1 which further comprises means for draining liquids from the container comprising a drainage system located beneath a floor of the container and accessible through perforations in said floor.

8. A system according to claim 1 which further comprises means for mechanically removing remediated mass from the container.

9. A system according to claim 1 wherein the container is supported by hollow structural members which form part of said piped network.

10. A system according to claim 9 wherein the hollow structural members comprise said one or more pressure vessels.

11. A method for the abiotic or biotic treatment of a permeable mass of remediable materials, said method comprising:
    (1) placing a permeable mass a remediable materials in a container of a system, a container for holding said remediable materials, a piped network system including a plurality of conduits each having an outlet arranged within the container, said outlets being set out in an array which includes different horizontal and vertical planes, one or more pressure vessels arranged in the piped network system for storing predefined quantities of resources required to remediate and change the physical and/or chemical structure of the mass under pressure, and means for supplying said resources under pressure from said vessel or vessels to each outlet of said conduit or group of conduits on a timed and repetitive basis.
    (2) adding to said mass through at least one outlet or group of outlets of the piped network of the system from a pressure vessel a predefined quantity of resources required to remediate and change the physical and/or chemical structure of the mass,
    (3) repeating said addition on a timed basis using the same or different outlets or groups of outlets and allowing remediation of said material to proceed, and thereafter
    (4) mechanically removing remediated material from said container.

12. A system according to claim 11 wherein the resources are supplied to the container at a pressure in excess of one atmosphere.

13. A system according to claim 11 wherein the resources are selected from the group consisting of micro-organisms, abiotic inoculums, particulate substances and combinations thereof.

14. A system according to claim 11 wherein the resources are a fluid comprising a viable population of micro-organisms.

15. A system according to claim 11 wherein the resources comprise a fluid comprising one or more of oxygen, nitrogen, phosphorus, potassium, ammonia, carbon dioxide, or a bio-remediation promoting trace element.

16. A system according to claim 11 wherein the biotic treatment is anaerobic.

17. A system according to claim 11 wherein the biotic treatment is aerobic.

* * * * *